Figure 1:
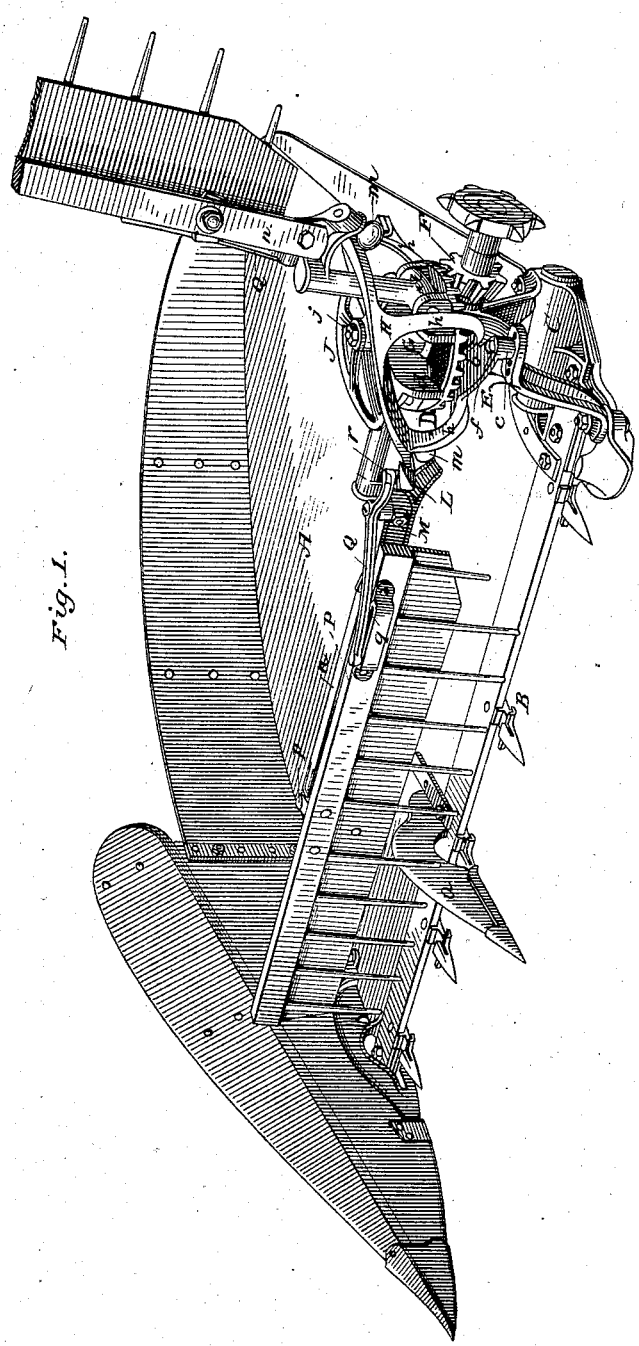

(Model.)

4 Sheets—Sheet 1.

P. S. WISEMAN.
Harvester Rake.

No. 237,353.                    Patented Feb. 1, 1881.

Attest:
R. F. Barnes
A. B. Smith

Inventor:
Philip S. Wiseman
By his atty
R. D. O. Smith (Model.)
4 Sheets—Sheet 2.
P. S. WISEMAN.
Harvester Rake.
No. 237,353.
Patented Feb. 1, 1881.
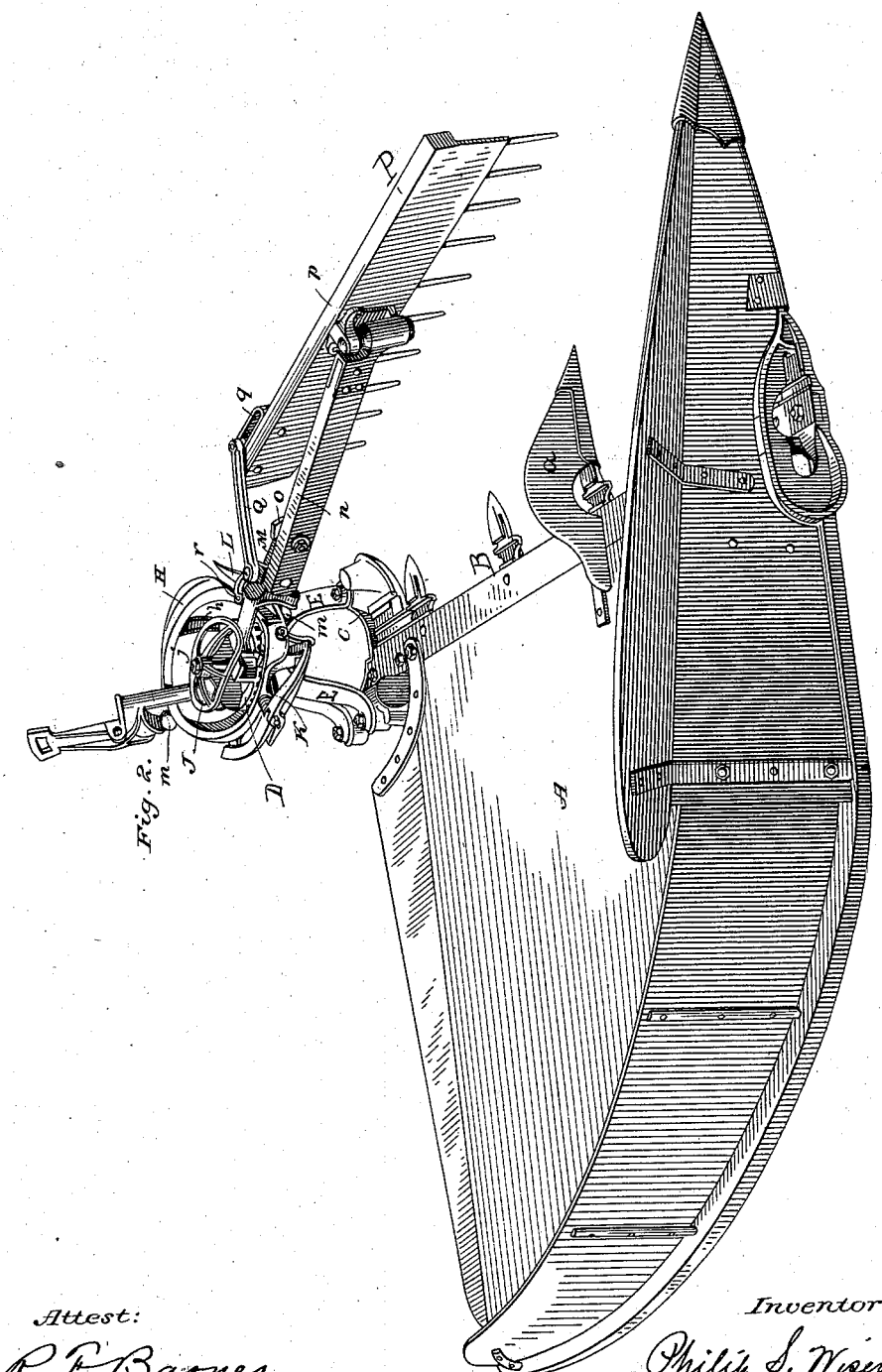
Attest:
R. F. Barnes
A. B. Smith
Inventor:
Philip S. Wiseman
By his atty
R. D. Smith

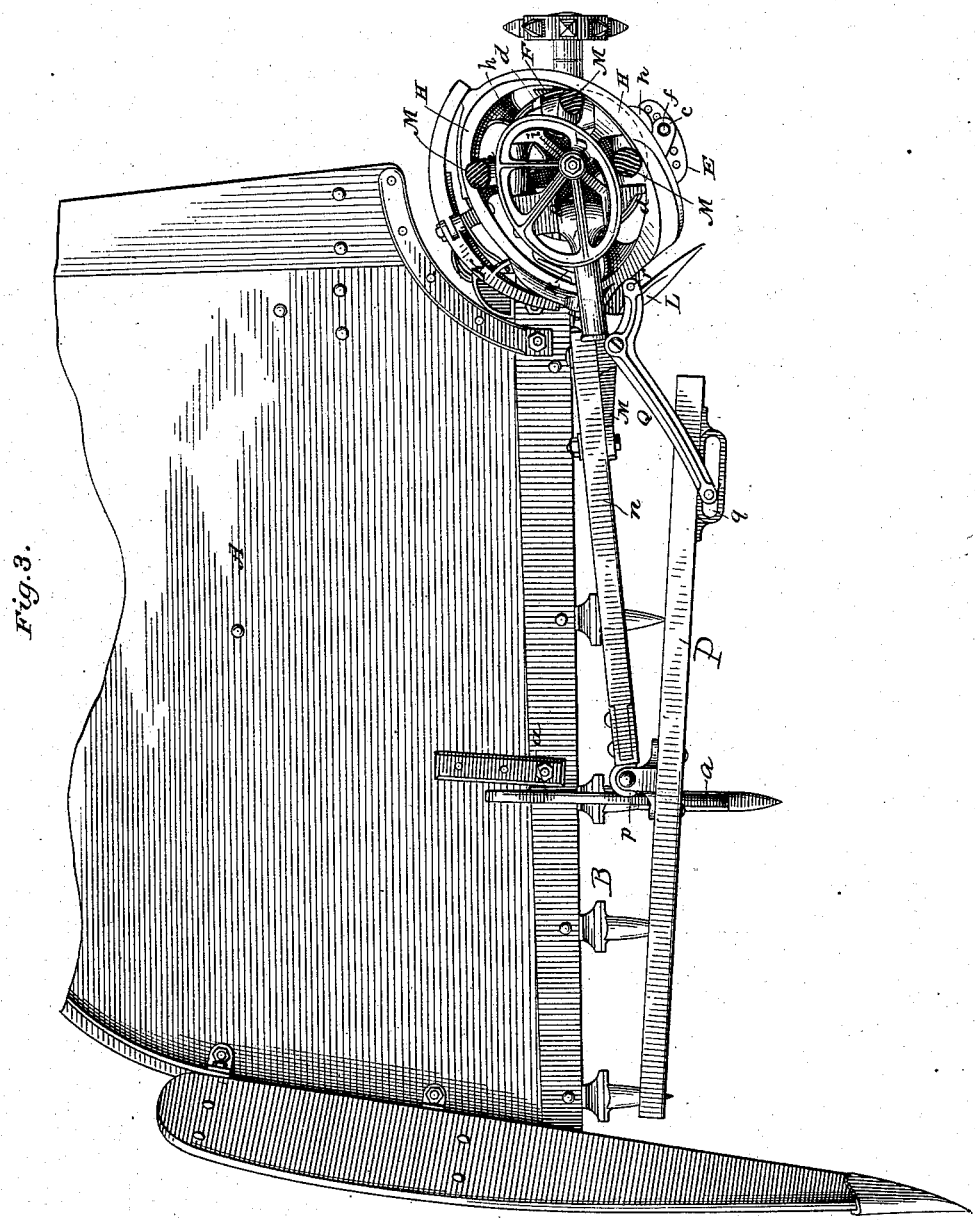

(Model.)
4 Sheets—Sheet 4.
P. S. WISEMAN.
Harvester Rake.
No. 237,353.  Patented Feb. 1, 1881.
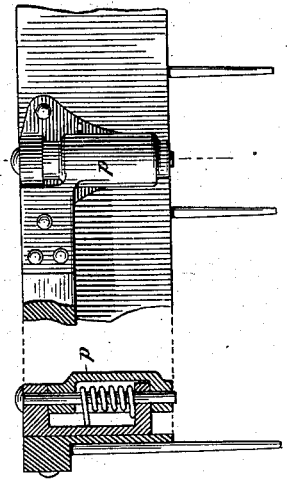
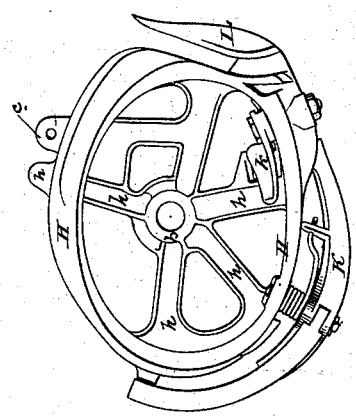
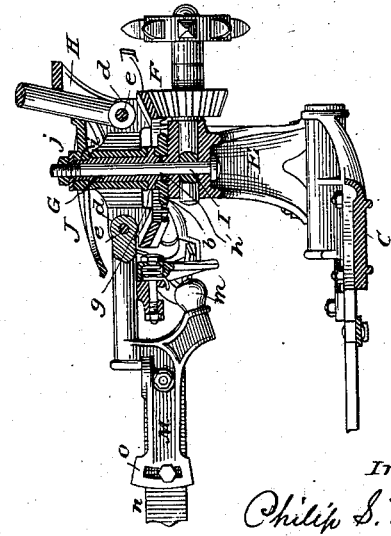
Attest:
R. F. Barnes.
A. B. Smith
Inventor:
Philip S. Wiseman
By his Atty
R. D. O. Smith

UNITED STATES PATENT OFFICE.

PHILIP S. WISEMAN, OF SPRINGFIELD, OHIO.

HARVESTER-RAKE.

SPECIFICATION forming part of Letters Patent No. 237,353, dated February 1, 1881.

Application filed June 17, 1880. (Model.)

*To all whom it may concern:*

Be it known that I, PHILIP S. WISEMAN, of Springfield, Clarke county, Ohio, have invented a new and useful Improvement in Automatic Combined Rakes and Reels for Harvesting-Machines; and I do hereby declare that the following is a full and complete description of the same.

My invention relates to that class of rakes known as "revolving sweep-rakes," consisting of several radial arms projecting from a single revolving rake-head, and guided in the path of revolution by a suitable cam or trackway arranged around the axis of revolution.

It is well known that the outer ends of rakes of this description move at a greater distance from the center than at the inner ends, and consequently with a greater surface-speed; and that, therefore, the grain at the outer end of the cutter is more violently affected than that at the inner end. It is also well known that rakes of this description necessarily approach the cutters in a position oblique to the same, because when fixed relatively to the center of revolution the arm cannot be parallel with a fixed line except during one moment of its revolution. These have always been recognized as defects to be overcome only by imparting a rectilinear motion to a revolving rake during such a part of its orbit as may be required to produce the effect desired in the vicinity of the cutters. Hitherto attempts to correct these defects have been made in a variety of ways without attaining success in a satisfactory degree; but the method described herein satisfies the conditions of the service in manner entirely satisfactory, though further improvement in the details of the mechanism may be produced.

In describing the particular structure which I show in the drawings hereto attached, I do not propose to be limited thereto, because I am aware that said structure may be greatly modified in appearance and arrangement; but I do not think it can be essentially modified as to any principle of operation.

My device therefore consists, essentially, of a revolving rake-shaft bearing radial arms, and rake or reel heads pivoted to said arms and separately controlled, so that while said arms bear a constant relation to the center of revolution the rake may bear a varying relation thereto, and be caused to assume a tangential or radial position, as may be required.

The particular method of giving effect to the invention set forth in the preceding paragraph, which I show in the accompanying drawings, will now be described, but without proposing to limit myself to the particular structure, because, as before stated, the structure may be varied without changing the principle of operation.

That others may fully understand my invention, I will now particularly describe the device shown, having reference to the accompanying drawings, wherein—

Figure 1 is a perspective view of my machine from the inner front side. Fig. 2 is a perspective from the outer rear side. Fig. 3 is a plan of the machine. Figs. 4, 5, and 6 are details.

A is the quadrant-platform, having the cutting apparatus B at its front edge. The outer end of the cutting apparatus is provided with the usual devices, and is supported upon a grain-wheel, as usual. The center finger may also be provided with a rake-guard, $a$, as is customary, to prevent the teeth of the rake from striking it between the cutters. The inner end of the cutting apparatus is provided with the shoe C, which is coupled to the main frame of the machine by a jointed connection, as is usual. These parts of the machine are not designed to be different in any essential particular from the platform, cutting apparatus, and hinge-connection commonly used on quadrant-platform machines, the invention described and claimed in the patent being confined to the rake and its connections and structure.

The revolving-rake center is a bevel-wheel, D, which revolves upon an axial stud, G, mounted upon a bridge, E, and the wheel D is driven by a pinion, F, to which motion is transmitted from the master-wheel by some suitable transmitting mechanism. The bridge E is provided with front and rear legs, which rest upon and are firmly bolted to the shoe, respectively, in front or rear of the cutter-bar, so that the axis of the rake's revolution is nearly or quite vertical to the heel of the cutter-bar. The rake center D is provided with lugs d d, which form bearings for the ends of the joint-bolts e e, whereby the rake-arms are pivoted to the center D.

The rake cam or guide H is supported upon arms h h, extending upward from the base-plate b, which is mounted upon the bridge E, and secured by the axial or center bolt, I, which holds the center wheel, D, in place, so that said cam is at all times concentric with said center wheel. At one side, however, there is a lateral arm or extension, c, through which an adjustment-bolt, f, is passed into one of a series of holes in a projecting part of the bridge, so that the cam may be adjusted upon its axis and held in proper position to secure the proper timing and direction of the rake's movements.

The axial stud G is tubular and separate from the bridge E. It is provided with a flange, g, extending laterally near its bottom, and the bridge is provided with a low boss or hub, h', concentric with the orifice provided for the clamping-bolt I. The cam-guide H has a central orifice which is fitted to the hub h', but extends above it, and the bottom of the stud G fits also into said central orifice, and the flange g rests upon the upper surface of H, so that when the clamp-bolt I is drawn up tight the cam-frame is firmly clamped between the flange g and the top of the bridge E. At its upper end stud G is made with a square and shoulder, i, upon which the upper guide, J, is mounted. The center wheel, D, is fitted to revolve upon that part of the stud G which is between the flange g and shoulder i, so that when the clamp-bolt I is tightened up by the nut j at its upper end, and the guides H and J are firmly clamped, the wheel D may still turn freely on its bearing.

The cam-guide is provided with the usual switch K and latch k, whereby either of the beaters may be caused to act as rake, or either of the rakes may be caused to pass above the platform without removing the grain.

At the outer side of the cam-guide H there is a supplemental guide, L, the office of which is to aid in producing the parallel motion of the rake, heretofore mentioned.

The rake-arm is usually made in two parts, M and n, the former of which is iron and the latter wood. The part M is jointed by the bolt e to the center wheel, D, and is provided with the friction-roller m, which traverses the lower surface of the cam-guide H, to prevent the rake-arm from rising up, except when it is passing over the switches. It is also commonly provided with a transverse slot, o, near its outer extremity, whereby the direction of the wooden part n may be adjusted upon it.

The rake-head P is jointed at its middle, or thereabout, to the extremity of the rake-arm n, and for this purpose I find it convenient to construct a joint, as shown at p, with an inclosed spring, so that the rake will be returned to its position parallel with the arm n, and retained there during all that part of its circuit which does not require that it shall be parallel with the cutter-bar.

A lever, Q, is pivoted, at or near its center, to the part M, and at its inner extremity is provided with a stud, r, which enters and traverses the guide L, while its outer extremity similarly traverses a longitudinal slot, q, in the rake-head. This slot is most conveniently and preferably made in a metallic plate secured to the side of the rake-head, as shown. The stud r is somewhat in the rear of the rake-arm when the rake-head is in position parallel thereto, and the inner or working face of the guide L is, except at its front extremity, of less radial distance from the axis of motion than said stud r; consequently when said stud encounters said guide its lever Q is compelled to swing forward on its pivot to decrease the radial distance of said stud and enable it to pass said guide. This movement of the lever Q causes the rake-head P to swing on its joint p to a position parallel with the cutter-bar, and the conformation of the guide L is such that as the rake-arm moves backward in its revolution the relative position of the rake-head will be continually varied to preserve its parallelism with the cutter-bar until it passes over said bar, and said parallelism is no longer required when the stud r passes out of guide L.

It is manifest, if it is desired, the guide L may be arranged so as to impart the parallel movement described to the rake to move the grain away from the cutter, and said motion may therefore be in approaching the cutter, or in receding from there, or in both.

I desire it to be understood that in representing my device for producing a parallel motion of the rake in connection with the cam H, &c., I do not propose to be confined to the use of such cam, but limit my invention to the method of producing said motion by means of a pivoted rake-head and an operative lever controlled by a guide, independent of the general means for operating and controlling the movement of the rake.

Having described my invention, what I claim as new is—

1. A continuously-revolving rake or reel arm working upon a vertical axis, wherein the outer end of the rake moves faster than the inner end, combined with a rake-head pivoted to the rake-arm and connected to the driving-gearing by mechanism whereby the rake, in descending into the grain, is made parallel, or nearly so, to the cutting apparatus in advance of the same, and continued in parallelism therewith while moving backward until it has moved past the front edge of the cutting apparatus, for the purpose set forth.

2. A continuously-revolving rake supported on the inner side of the platform, in combination with mechanism whereby said rake has imparted to it a movement parallel with the cutter-bar and in substantially the same horizontal plane, as and for the purpose set forth.

3. The rake-head pivoted to the rake-arm, combined with mechanism connected with the rake-cam, whereby said rake-head is guided and controlled in its parallelism to the cutting apparatus and its rotary motion converted into a direct backward movement in the plane of the cutting apparatus, for the purpose set forth.

4. In the continuously-revolving rake or reel mounted upon the inner side of the platform, the rake-head hinged to the rake-arm on an axis perpendicular to a line which intersects the extremities of the rake-teeth, combined with mechanism whereby said rake is controlled, and has imparted to it a movement parallel with the cutting apparatus in front or rear of the knife, for the purpose of moving the grain in a line perpendicular to the cutter-bar, substantially as shown and described.

5. The rake-head hinged to the rake-arm, at or about midway the length of said head, by a vertical joint, and held and controlled by means of a suitable connection upon said rake-arm, and connection between said rake-head and cam-guide, substantially as shown.

6. The rake-arm M and rake-head P, provided with the loop-guide $q$, combined with the lever Q pivoted to said arm, and at one end engaged in said loop, and at the other end controlled by a cam, L, as and for the purpose set forth.

7. The rake-arm M and rake-head P, combined with the lever Q, whereby the rake-head is controlled, and the spring-hinge $p$, whereby, when said lever Q is out of engagement with the cam L, said rake-head is closed back against the rake-arm M, as set forth.

8. The rake-arm M, and rake-head P pivoted thereto, combined with a lever, Q, and cam L, whereby said rake-head may be moved away from said rake-arm, and a spring, whereby said rake-head will be returned and held against said rake-arm when said lever is out of engagement with said cam.

PHILIP S. WISEMAN.

In presence of—
  ROBT. C. RODGERS,
  E. H. BARNES.